United States Patent
Chen

(10) Patent No.: US 9,219,562 B2
(45) Date of Patent: Dec. 22, 2015

(54) SYSTEM AND METHOD TO DYNAMICALLY REDISTRIBUTE TIMING AND SYNCHRONIZATION IN A PACKET SWITCHED NETWORK

(71) Applicant: NOKIA SOLUTIONS AND NETWORKS OY, Espoo (FI)

(72) Inventor: David Chen, Wilmette, IL (US)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 52 days.

(21) Appl. No.: 14/272,978

(22) Filed: May 8, 2014

(65) Prior Publication Data

US 2015/0326332 A1 Nov. 12, 2015

(51) Int. Cl.
H01J 3/06 (2006.01)
H04J 3/06 (2006.01)

(52) U.S. Cl.
CPC ............ H04J 3/0658 (2013.01); H04J 3/0644 (2013.01)

(58) Field of Classification Search
None
See application file for complete search history.

(56) References Cited

U.S. PATENT DOCUMENTS

| | | | |
|---|---|---|---|
| 6,542,754 B1 | 4/2003 | Sayers et al. | |
| 8,010,138 B2 | 8/2011 | Kuru | |
| 2006/0245453 A1 | 11/2006 | Bedrosian | |
| 2010/0185893 A1* | 7/2010 | Wang et al. | 714/3 |
| 2012/0069943 A1* | 3/2012 | Lim et al. | 375/371 |
| 2013/0208698 A1* | 8/2013 | Taori et al. | 370/331 |
| 2013/0266306 A1* | 10/2013 | Kozaki et al. | 398/5 |
| 2014/0281037 A1* | 9/2014 | Spada et al. | 709/248 |

OTHER PUBLICATIONS

"IEEE Standard for a Precision Clock Synchronization Protocol for Networked Measurement and Control Systems", IEEE Instrumentation and Measurement Society: Techincal Committee on Sensor Technology (TC-9), IEEE Std 1588-2008: Jul. 24, 2008 (289 pages).
International Search Report and Written Opinion dated Jul. 29, 2015 corresponding to International Patent Application No. PCT/EP2015/060107.

* cited by examiner

Primary Examiner — Kibrom T Hailu
(74) Attorney, Agent, or Firm — Squire Patton Boggs (US) LLP

(57) ABSTRACT

Systems, methods, apparatuses, and computer program products for dynamically redistributing timing and synchronization in a packet switched network are provided. One method includes creating, by a slave node, a peer list comprising an identifier of at least one peer slave node that shares a same master node as the slave node or that has a certain predefined affinity with the slave node. The method may also include announcing a holdover time of the slave node to the at least one peer slave node, and, when a predefined event occurs, announcing to the at least one peer slave node that the slave node is taking on a mini-master role for at least the announced holdover time.

13 Claims, 3 Drawing Sheets

SYSTEM AND METHOD TO DYNAMICALLY REDISTRIBUTE TIMING AND SYNCHRONIZATION IN A PACKET SWITCHED NETWORK

BACKGROUND

1. Field

Certain embodiments of the invention generally relate to timing and synchronization in communications networks, such as packet switched networks.

2. Description of the Related Art

The Precision Time Protocol (PTP), as originally defined in the institute of Electrical and Electronics Engineers (IEEE) 1588 standard, is a protocol used to synchronize clocks throughout a computer or communications network. On a local area network, for example, PTP may achieve clock accuracy in the sub-microsecond range. IEEE 1588 version 2 defines a PTP with improved accuracy but that is not backwards compatible with the original version.

The IEEE 1588 standards describe a hierarchical master-slave architecture for clock distribution. In particular, IEEE 1588 describes a time distribution system that includes at least one communication media and clocks. An ordinary clock is included in a device with a single network connection and is either the source of or destination for a synchronization reference. The source device may be referred to as a master node; the destination device may be referred to as a slave node. A boundary clock is included in a device with multiple network connections and can accurately bridge synchronization from one network segment to another. A synchronization master is selected for each of the network segments in the system.

IEEE 1588v2 introduces a clock associated with network equipment used to convey PTP messages. This transparent clock modifies PTP messages as they pass through the device. Timestamps in the messages are corrected for time spent traversing the network equipment thereby improving distribution accuracy by compensating for delivery variability across the network.

SUMMARY

One embodiment is directed to a method that includes creating, by a slave node, a peer list comprising an identifier of at least one peer slave node that shares a same master node as the slave node or that has a certain predefined affinity with the slave node. The method may also include announcing a holdover time of the slave node to the at least one peer slave node, and, when a predefined event occurs, announcing to the at least one peer slave node that the slave node is taking on a mini-master role for at least the announced holdover time.

Another embodiment is directed to an apparatus including at least one processor and at least one memory including computer program code. The at least one memory and computer program code may be configured, with the at least one processor, to cause the apparatus at least to create a peer list comprising an identifier of at least one peer slave node that shares a same master node as the apparatus or that has a certain predefined affinity with the apparatus. The at least one memory and computer program code may be further configured, with the at least one processor, to cause the apparatus at least to announce a holdover time of the apparatus to the at least one peer slave node, and, when a predefined event occurs, announce to the at least one peer slave node that the apparatus is taking on a mini-master role for at least the announced holdover time.

Another embodiment is directed to a computer program, embodied on a non-transitory computer readable medium. The computer program may be configured to control a processor to perform a process. The process may include creating, by a slave node, a peer list comprising an identifier of at least one peer slave node that shares a same master node as the slave node or that has a certain predefined affinity with the slave node. The process may further include announcing a holdover time of the slave node to the at least one peer slave node, and, when a predefined event occurs, announcing to the at least one peer slave node that the slave node is taking on a mini-master role for at least the announced holdover time.

BRIEF DESCRIPTION OF THE DRAWINGS

For proper understanding of the invention, reference should be made to the accompanying drawings, wherein.

DETAILED DESCRIPTION

Figure 1:
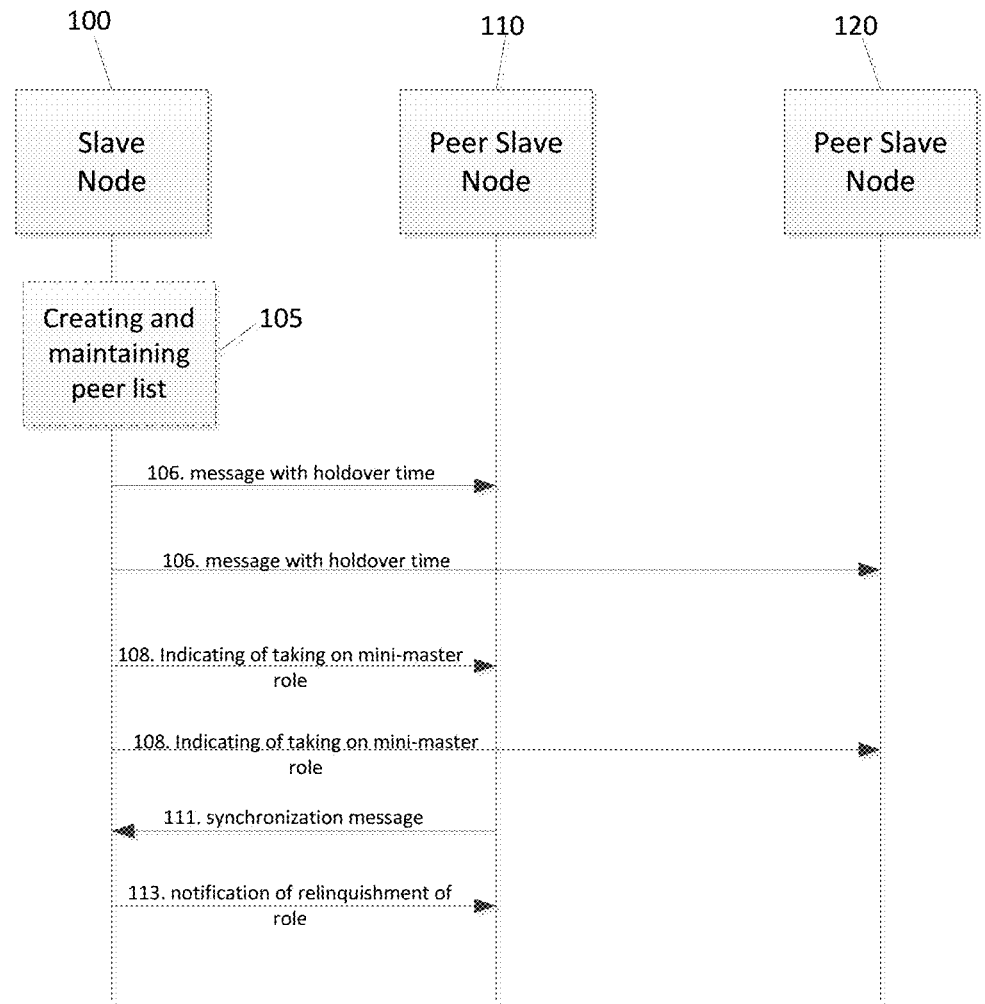
FIG. 1 illustrates a signaling diagram according to one embodiment.

It will be readily understood that the components of the invention, as generally described and illustrated in the figures herein, may be arranged and designed in a wide variety of different configurations. Thus, the following detailed description of the embodiments of systems, methods, apparatuses, and computer program products for dynamically redistributing timing and synchronization in a packet switched network, as represented in the attached figures and described below, is not intended to limit the scope of the invention but is representative of selected embodiments of the invention.

The features, structures, or characteristics of the invention described throughout this specification may be combined in any suitable manner in one or more embodiments. For example, the usage of the phrases "certain embodiments," "some embodiments," or other similar language, throughout this specification refers to the fact that a particular feature, structure, or characteristic described in connection with the embodiment may be included in at least one embodiment of the present invention. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more embodiments.

Additionally, if desired, the different functions discussed below may be performed in a different order and/or concurrently with each other. Furthermore, if desired, one or more of the described functions may be optional or may be combined. As such, the following description should be considered as merely illustrative of the principles, teachings and embodiments of this invention, and not in limitation thereof.

As mentioned above, IEEE 1588v2 describes the current approach in the timing and synchronization technology over a packet switched network, where certain network nodes take on the master role and other nodes taking on the slave role.

Nodes taking on the master role (i.e., Master nodes) may typically equipped with a high quality oscillator that allows longer holdover time in case of losing its timing reference from a Primary Reference Clock (PRC) such as global navigation satellite system (GNSS).

Nodes taking on the Slave role (i.e., Slave nodes) may typically equipped with a lower quality oscillator with a shorter holdover time. For small cell applications where the primary role of a small cell node is for capacity injection instead of coverage, the requirement for the holdover time can be further reduced to, e.g., 30 minutes with a very low cost (and low quality) oscillator.

Multiple Slave nodes can achieve their timing synchronization with a dedicated Master node via exchanging certain timing packets over the packet switched network. For example, in the IEEE1588v2 standard, a Master node sends regular synchronization message(s) and responds to a Delay Request message from subordinated Slave nodes to allow Slave nodes to sync up with itself.

Slave nodes will get into internal free run holdover mode if it loses its synchronization with its dedicated Master node. In the current packet based synchronization design, such as 1588v2 PTP and Network Timing Protocol (NTP), the synchronization distribution is purely a Master-Slave hierarchy without the slave to re-distribute timing among other impacted slaves.

In a telecommunications network, Slave nodes are typically the base stations that sync up their phase and frequency synchronization with a Master node via the Ethernet or IP packet switched backhaul. If somehow the base station loses its communication with the Master node (typically called a Grand Master Clock), such as when the Master node fails or there is a backhaul outage, it will enter into a holdover period with its oscillator in free run mode providing synchronization for a few minutes/hours/days depending on the quality of oscillator equipped. For example, a Rubidium type of atomic oscillator can provide days of holdover time; a single Oven/Double Oven OXCO (Oven Controlled Crystal Oscillator) typically provides hours of holdover time; and a relatively low cost TCXO (Temperature Compensated Crystal Oscillator) has much lower holdover time.

After the holdover time elapses, the base station can no longer guarantee phase and frequency synchronization within the radio access network (RAN). As a result, call quality may begin to degrade, inter-base station interference starts to increase, and eventually all calls will be dropped.

Currently, there is no other way for the Slave node to recover its synchronization except to wait for the communication between itself and its Master node to be recovered or for the Slave node be advised to sync up with another Master node through some predefined Best Master Clock (BMC) algorithm.

Another problem is the inherent jitter and latency within the packet switched network that can sometimes significantly degrade the phase and frequency synchronization performance on the Slave nodes. In this case, even though Slave nodes can still communicate with the Master node, its degraded synchronization performance will still cause similar problems as a loss of communication with the Master node.

Therefore, there is a need for techniques to allow Slave nodes to take on a more proactive role to dynamically redistribute timing and synchronization among themselves in cases of loss of communication with Master nodes or when they determine that the synchronization performance has degraded below a certain threshold due to significant delay and jitter experienced over the packet switched network. This may be of particular importance for small cell/indoor femto cell applications where a cluster of nearby small cells/femto cells typically relies on a single grand master clock (GMC) for synchronization. However, this is obviously not the only situation that would benefit from embodiments of the present invention.

Embodiments of the invention provide robust systems and methods that enable Slave nodes to proactively take on the GMC role temporarily in order to extend the holdover time for other slave nodes with inferior oscillator quality (and thus lower holdover time).

According to one embodiment, each Slave node maintains a list of peer Slave nodes that either share the same Master node or have a certain predefined affinity, and announces its holdover time performance to all other Slave nodes in the peer list.

In most base station synchronization implementations, GNSS is typically used as the primary reference clock source. When GNSS is in outage, the system may switch to other synchronization sources such as 1588v2 PTP Timing over Packet, SyncE, etc. When all synchronization sources fail, systems will then fall back to a local oscillator to provide holdover. Different qualities of oscillator provide different holdover stability. There are many factors that can determine the quality of an oscillator, such as frequency range, stability (frequency drift vs. temperature), temperature range, ageing stability, etc. Therefore, one example of a certain predefined affinity may be slave nodes that are equipped with the same quality of oscillator weighted by available synchronization sources. A slave with the same quality oscillator can declare itself with superior holdover performance if it has additional synchronization source than its peers. For example, a slave with both 1588v2 PTP and SyncE as synchronization source can declare superior holdover performance than the slave with only the 1588v2 PTP input.

Then, in an embodiment, when a Slave node determines it has lost its communication with the Master node or the delay and jitter in the communication path with its Master node has degraded beyond a certain threshold, the Slave node may announce to other Slave nodes on its peer list that it intends to take on the mini-Master role for at least its pre-announced holdover time. Other Slave nodes, after receiving such announcements from one or more other associated Slave nodes, may determine whether they wants to synchronize with one mini-Master node or whether they should also take on the mini-Master role and start sending their own announcement to other peer Slave nodes.

Three network attributes may impact performance in IEEE 1588: packet loss, packet delay, and packet delay variation (PDV). A packet loss is caused when resources in a network element are no longer sufficient for handling all the ingress traffic. Depending on the specific implementation, a network element will start dropping packets beginning with low priority traffic to protect loss of packets at higher priority. However, packet loss is not an issue for IEEE 1588v2 because the clock recovery algorithm suite is leveraging an observation window that may span over several seconds. The timestamps are all relative to stable time references, not to the previous packet; therefore, the Slave node will simply wait for the next packet to arrive to obtain the information it requires. Therefore, a loss of packet or even group of packets does not have much influence on the clock recovery performance.

A packet delay is the time it takes a packet to traverse from ingress to egress of network element. A packet delay is the accumulation of the packet delays from each network element including the path between network ingress to network egress. A packet delay through a transport network can be on the order of few milliseconds, however this has little impact on the accuracy of the clock out as it is comparatively small to the clock recovery observation time.

Packet Delay Variation (PDV) (or jitter) is caused by packet streams at the network element's ingress that are being queued until served. The amount of time a packet will stay in a queue is depending on the traffic load, number of traffic streams, packet length statistics, traffic priority, and network topology (e.g., traffic from a number of ingress ports is switched to the same egress port). The PDV is the main impairment affecting the accuracy of the recovered clock in the slave. The variation in delay from packet to packet through the PSN induces noise in the slave node's perception of the time at the master node. Constant delay would cause a fixed offset, whereas variable delay causes a varying estimate of the offset. The performance of the slave node is affected by both the magnitude of the PDV and how effective the slave node's clock recovery algorithm suite is at removing this noise.

Thus, in one embodiment, an example of the threshold that would trigger a slave node to take on a mini-master role is that maximal PDV should be below 5 msec while the normalized PDV should indicate that at least 5% of packets had been successful traversing the network at (or close to) the minimum delay. If the packet delay variation exceeds such a threshold, the slave will not be able to maintain the clock recovery accuracy.

In an embodiment, a Slave node that has taken on the mini-Master role will stop sending its own mini-Master announcements immediately upon receiving announcements from other Slave nodes with better holdover time (i.e., a higher holdover time).

According to one embodiment, a Slave node that is not taking on the mini-Master role but receives mini-Master announcements from other peer Slave nodes will decide which peer Slave node has the best holdover time and will decide whether to sync up with it. In an embodiment, a Slave node that lost its communication with its Master node will need to synchronize with a Peer Slave node (in a mini-master role) that has the best holdover time.

In an embodiment, a Slave node that still maintains communication with its Master node may synchronize with the Peer Slave node with the best holdover time if it determines that the communication path between itself and that Peer Slave node experiences much less delay and jitter than the communication path with the Master node.

Further, in one embodiment, a Slave node taking on the mini-Master role will relinquish its role if it has restored its communication with the Master node and/or it has determined that delay and jitter between itself and the Master node has receded to a certain threshold. Upon relinquishing its mini-Master role after the restoration of communication with the GMC, the Slave node will notify all its subordinate slave nodes to either try to re-establish communication with the GMC or synchronize with another mini-Master. In an embodiment, the Slave can also choose to turn itself into a Boundary Clock to continuously serve its subordinated slave nodes.

FIG. 1 illustrates a signalling diagram depicting one embodiment of the invention. In this embodiment, a slave node 100 creates and/or maintains a peer list 105 including identifiers of peer slave nodes that either share the same master node as slave node 100 or have a certain predefined affinity with slave node 100. In the example of FIG. 1, the peer list may include peer slave node 110 and peer slave node 120. It should be understood that any number of peer slave nodes may be included according to embodiments of the invention. FIG. 1 merely illustrates one example.

At 106, slave node 100 sends a message including its holdover time to peer slave node 110 and to peer slave node 120. Then, at 108, slave node 100 sends a message indicating that it is taking on a mini-master role to peer slave node 110 and to peer slave node 120. This may occur, for example, when slave node 100 determines it has lost its communication with the master node or the delay and jitter in the communication path with its master node has degraded beyond a certain threshold. The mini-master role means that slave node 100 is temporarily taking on the tasks of its master node. At 111, peer slave node 110 sends a synchronization message to slave node indicating that it is synchronizing with slave node 100.

When slave node 100 has restored its communication with the master node and/or it has determined that delay and jitter between itself and the master node has receded to a certain threshold, at 113, slave node 100 sends a notification to peer slave node 110 that it is relinquishing its mini-master role. The notification 113 may include a notification to the peer slave node 110 to either try to re-establish communication with its master node or to synchronize with another mini-master node.

Figure 2:
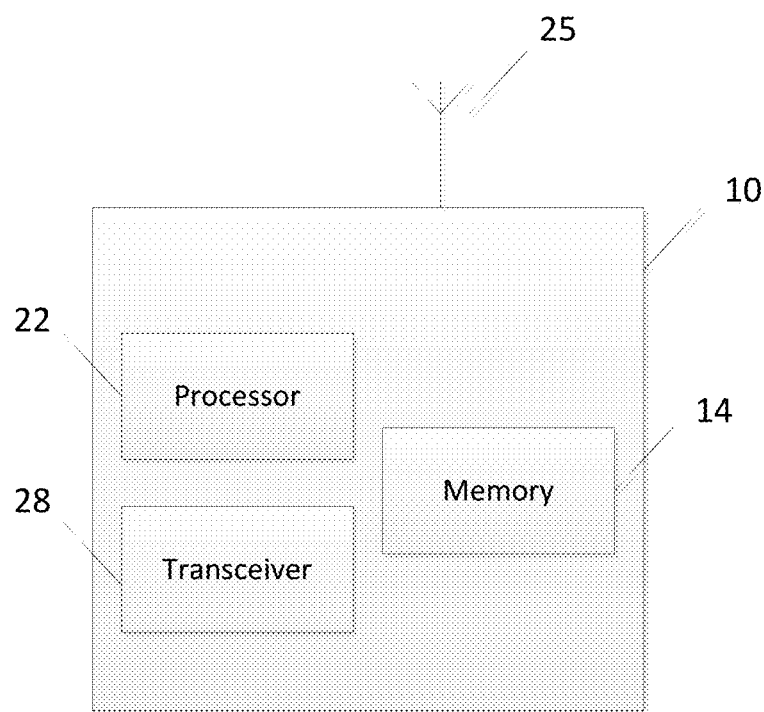
FIG. 2 illustrates a block diagram of an apparatus according to an embodiment.

FIG. 2 illustrates an example of an apparatus 10 according to an embodiment. In an embodiment, apparatus 10 may be a node, host, or server in a communications network or serving such a network, such as a Long Term Evolution (LTE) network or $5^{th}$ generation (5G) network. It should be noted that one of ordinary skill in the art would understand that apparatus 10 may include components or features not shown in FIG. 2.

As illustrated in FIG. 2, apparatus 10 includes a processor 22 for processing information and executing instructions or operations. Processor 22 may be any type of general or specific purpose processor. While a single processor 22 is shown in FIG. 2, multiple processors may be utilized according to other embodiments. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples.

Apparatus 10 may further include or be coupled to a memory 14 (internal or external), which may be coupled to processor 22, for storing information and instructions that may be executed by processor 22. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. For example, memory 14 can be comprised of any combination of random access memory (RAM), read only memory (ROM), static storage such as a magnetic or optical disk, or any other type of non-transitory machine or computer readable media. The instructions stored in memory 14 may include program instructions or computer program code that, when executed by processor 22, enable the apparatus 10 to perform tasks as described herein.

Apparatus 10 may also include or be coupled to one or more antennas 25 for transmitting and receiving signals and/or data to and from apparatus 10. Apparatus 10 may further include or be coupled to a transceiver 28 configured to transmit and receive information. For instance, transceiver 28 may be configured to modulate information on to a carrier waveform for transmission by the antenna(s) 25 and demodulate information received via the antenna(s) 25 for further processing by other elements of apparatus 10. In other embodiments, transceiver 28 may be capable of transmitting and receiving signals or data directly.

Processor 22 may perform functions associated with the operation of apparatus 10 which may include, for example, precoding of antenna gain/phase parameters, encoding and decoding of individual bits forming a communication message, formatting of information, and overall control of the apparatus 10, including processes related to management of communication resources.

In an embodiment, memory 14 may store software modules that provide functionality when executed by processor 22. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

In one embodiment, apparatus 10 may be a slave node in a packet switched network. In this embodiment, apparatus 10 may be controlled by memory 14 and processor 22 to create a peer list comprising an identifier of at least one peer slave node that shares a same master node as the apparatus 10 or that has a certain predefined affinity with the apparatus 10. Apparatus 10 may then be controlled by memory 14 and processor 22 to announce the holdover time of the apparatus 10 to the at least one peer slave node. When a predefined event occurs, apparatus 10 may be further controlled by memory 14 and processor 22 to announce to the at least one peer slave node that the apparatus 10 is taking on a mini-master role for at least the announced holdover time.

In an embodiment, the predefined event includes determining that the apparatus has lost communication with its master node or when the delay and jitter in the communication path with the master node has degraded below a certain threshold.

According to one embodiment, apparatus 10 may be controlled by memory 14 and processor 22 to receive synchronization messages from one or more subordinate slave nodes that decide to synchronize with the apparatus 10 that is taking on the mini-master role. However, when the apparatus 10 receives an announcement from another slave node indicating that it is taking on a mini-master role with a better holdover time, the apparatus 10 may be controlled by memory 14 and processor 22 to immediately stop the sending of its own mini-master announcements.

In an embodiment, apparatus 10 may be controlled by memory 14 and processor 22 to relinquish the mini-master role when the predefined event ends (i.e., when apparatus 10 has restored its communication with the master node and/or it has determined that delay and jitter between itself and the master node has receded to a certain threshold), and to notify the subordinate slave node(s) to try to re-establish communication with the master node or to synchronize with another mini-master node. In one embodiment, when the pre-defined event ends, apparatus 10 may be controlled by memory 14 and processor 22 to decide to become a boundary clock to continuously serve the subordinate slave node(s).

Figure 3:
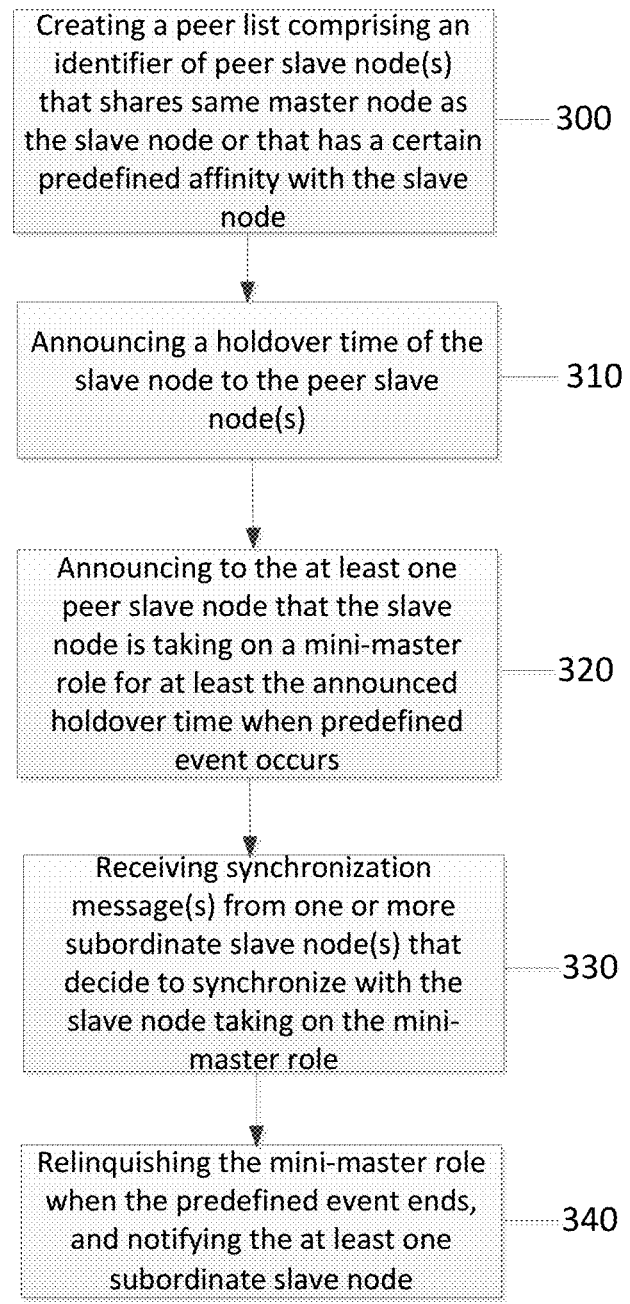
FIG. 3 illustrates a flow diagram of a method according to an embodiment.

FIG. 3 illustrates a flow diagram of a method according to one embodiment of the invention. In an embodiment, the method depicted in FIG. 3 may be performed, for example, by a slave node in a packet switched network. In this example, the method may include, at 300, creating a peer list comprising an identifier of at least one peer slave node that shares a same master node as the slave node or that has a certain predefined affinity with the slave node. The method may also include, at 310, announcing a holdover time of the slave node to the at least one peer slave node. At 320, the method may include, when a predefined event occurs, announcing to the at least one peer slave node that the slave node is taking on a mini-master role for at least the announced holdover time. In one embodiment, the predefined event includes determining that the slave node has lost communication with its master node or when the delay and jitter in the communication path with the master node has degraded below a certain threshold.

In one embodiment, the method of FIG. 3 may further include, at 330, receiving synchronization message(s) from one or more subordinate slave node(s) that decide to synchronize with the slave node taking on the mini-master role. According to one embodiment, the method may include, when the slave node receives an announcement from another slave node indicating that said another slave node is taking on a mini-master role with a better holdover time, immediately stopping, by the slave node, the sending of its own mini-master announcements.

According to an embodiment, the method may also include, at 340, relinquishing the mini-master role when the predefined event ends, and notifying the at least one subordinate slave node to try to re-establish communication with the master node or to synchronize with another mini-master node. In other embodiments, when the pre-defined event ends, the method may include the slave node deciding to become a boundary clock to continuously serve the at least one subordinate slave node.

In some embodiments, the functionality of any of the methods described herein, such as those illustrated in FIG. 3 discussed above, may be implemented by software and/or computer program code stored in memory or other computer readable or tangible media, and executed by a processor. In other embodiments, the functionality may be performed by hardware, for example through the use of an application specific integrated circuit (ASIC), a programmable gate array (PGA), a field programmable gate array (FPGA), or any other combination of hardware and software.

As a result of certain embodiments of the invention, a majority of slave nodes can take on very low cost oscillators to further reduce the CapEx of the base station and rely on a few slaves that are equipped with higher quality oscillators to redistribute timing during their holdover time. This allows other slave nodes with lower cost oscillators (and therefore lower holdover performance) to enjoy the same holdover performance as those slaves with higher quality oscillators and better holdover performance.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

I claim:
1. A method, comprising:
   creating, by a slave node, a peer list comprising an identifier of at least one peer slave node that shares a same master node as the slave node or that has a certain predefined affinity with the slave node;
   announcing a holdover time of the slave node to the at least one peer slave node; and when a predefined event occurs, announcing to the at least one peer slave node that the slave node is taking on a mini-master role for at least the announced holdover time.

2. The method according to claim 1, wherein the predefined event comprises determining that the slave node has lost communication with its master node or when the delay and jitter in the communication path with the master node has degraded below a certain threshold.

3. The method according to claim 1, further comprising receiving synchronization messages from at least one subordinate slave node that decide to synchronize with the slave node taking on the mini-master role.

4. The method according to claim 1, further comprising:
when the slave node receives an announcement from another slave node indicating that said another slave node is taking on a mini-master role with a better holdover time, immediately stopping, by the slave node, the sending of its own mini-master announcements.

5. The method according to claim 3, further comprising relinquishing the mini-master role when the predefined event ends, and notifying the at least one subordinate slave node to try to re-establish communication with the master node or to synchronize with another mini-master node.

6. The method according to claim 3, further comprising, when the pre-defined event ends, deciding to become a boundary clock to continuously serve the at least one subordinate slave node.

7. An apparatus, comprising:
at least one processor; and
at least one memory including computer program code,
the at least one memory and computer program code configured, with the at least one processor, to cause the apparatus at least to
create a peer list comprising an identifier of at least one peer slave node that shares a same master node as the apparatus or that has a certain predefined affinity with the apparatus;
announce a holdover time of the apparatus to the at least one peer slave node; and
when a predefined event occurs, announce to the at least one peer slave node that the apparatus is taking on a mini-master role for at least the announced holdover time.

8. The apparatus according to claim 7, wherein the predefined event comprises determining that the apparatus has lost communication with its master node or when the delay and jitter in the communication path with the master node has degraded below a certain threshold.

9. The apparatus according to claim 7, wherein the at least one memory and the computer program code are further configured, with the at least one processor, to cause the apparatus at least to receive synchronization messages from at least one subordinate slave node that decide to synchronize with the apparatus taking on the mini-master role.

10. The apparatus according to claim 7, wherein, when the apparatus receives an announcement from another slave node indicating that said another slave node is taking on a mini-master role with a better holdover time, the at least one memory and the computer program code are further configured, with the at least one processor, to cause the apparatus at least to immediately stop the sending of its own mini-master announcements.

11. The apparatus according to claim 9, wherein the at least one memory and the computer program code are further configured, with the at least one processor, to cause the apparatus at least to relinquish the mini-master role when the predefined event ends, and to notify the at least one subordinate slave node to try to re-establish communication with the master node or to synchronize with another mini-master node.

12. The apparatus according to claim 9, wherein the at least one memory and the computer program code are further configured, with the at least one processor, to cause the apparatus at least to, when the pre-defined event ends, decide to become a boundary clock to continuously serve the at least one subordinate slave node.

13. A computer program, embodied on a non-transitory computer readable medium, the computer program configured to control a processor to perform a process, comprising:
creating, by a slave node, a peer list comprising an identifier of at least one peer slave node that shares a same master node as the slave node or that has a certain predefined affinity with the slave node;
announcing a holdover time of the slave node to the at least one peer slave node; and
when a predefined event occurs, announcing to the at least one peer slave node that the slave node is taking on a mini-master role for at least the announced holdover time.

* * * * *